J. MARTIN.
CLAMP BELT GUIDE.
APPLICATION FILED FEB. 17, 1921.
1,385,878.
Patented July 26, 1921.
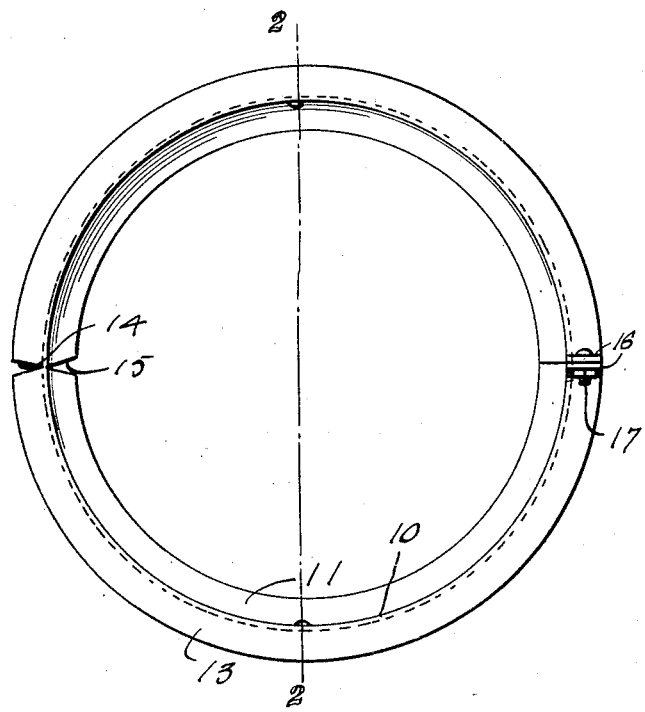
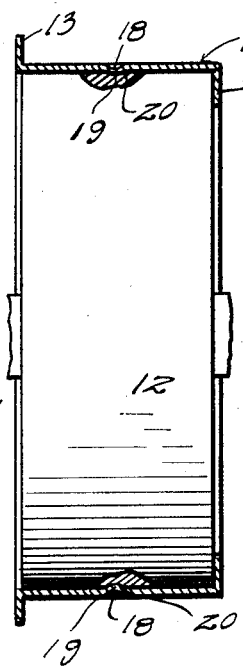
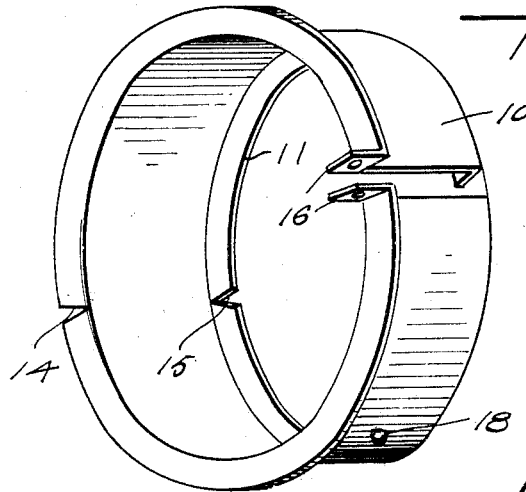
Inventor
J. Martin

UNITED STATES PATENT OFFICE.

JOHN MARTIN, OF AMORITA, OKLAHOMA.

CLAMP-BELT GUIDE.

1,385,878.   Specification of Letters Patent.   Patented July 26, 1921.

Application filed February 17, 1921. Serial No. 445,725.

*To all whom it may concern:*

Be it known that I, JOHN MARTIN, a citizen of the United States, residing at Amorita, in the county of Alfalfa and State of Oklahoma, have invented certain new and useful Improvements in Clamp-Belt Guides; and I do hereby declare the following to be a full, clear, and exact description of the invention, such as will enable others skilled in the art to which it appertains to make and use the same.

The object of the invention is to provide a simple, inexpensive and efficient means adapted to be disposed in clamping relation with the drive pulley of an engine such as those used in connection with Ford automobiles and similar machines as a means of maintaining the belt in proper relation therewith, such means being readily replaceable when worn or otherwise rendered inoperative or ineffective by use; and with this object in view the invention consists in a construction, and arrangement of parts of which a preferred embodiment is shown in the drawing, wherein:

Figure 1 is a side view, and

Fig. 2 is a cross sectional view on the plane indicated by the line 2—2 of Fig. 1, of a belt guide clamp applied in the operative position to a drive pulley.

Fig. 3 is a detail perspective view of the guide detached.

The device consists of a band 10 of sheet metal having an inturned flange 11 adapted to bear against the inner edge or face of a drive pulley such as indicated at 12 and an exterior or outwardly directed guide flange 13 arranged at the opposite edge from the flange 11, said flanges being split or kerfed as indicated at 14 and 15 to permit of the shaping thereof to the pulley with the ends of the exterior flange turned outward to form wings 16 for engagement by a fastening bolt 17 serving as a means of drawing the ends of the band together to securely clamp the device upon the peripheral surface of the pulley.

As an additional means of security, and more particularly to prevent the slipping of the band on the surface of the pulley due to the load upon or resistance offered to the movement of the belt, depressions 18 are formed in the band to provide interior projections 19 to engage the depressions 20 in the surface of the pulley. Said depressions 18 may consist as shown merely of punch indents or the like, and the guide is formed of a single blank of metal such as can readily be shaped on a die in a single operation. As will be understood the exterior flange serves to prevent the belt from slipping out of place or becoming disengaged from the pulley while the inturned or interior flange acts as a means of steadying the guide and insuring the firm attachment thereof to the pulley, against creeping movement axially thereof.

Having thus described the invention, what I claim is:—

1. A belt guide clamp for drive pulleys having a band provided at its opposite side edges with inwardly and outwardly directed flanges, split to permit of conforming to the contour of the pulley, the exterior flange having terminal deflected wings for engagement by a securing bolt.

2. A belt guide clamp for drive pulleys having a band provided at its opposite side edges with inwardly and outwardly directed flanges, split tubes conforming to the contour of the pulley, said clamp having means to engage the face of the pulley as additional means of security and to prevent the slipping of the band on the surface of the pulley due to the load upon or resistance offered to the movement, and means for securely clamping the belt guide clamp upon the pulley.

In testimony whereof I affix my signature in presence of two witnesses.

JOHN MARTIN.

Witnesses:
EDWARD A. MCCORD,
E. R. PERRY.